United States Patent [19]
Saint Martin

[11] Patent Number: 6,076,437
[45] Date of Patent: Jun. 20, 2000

[54] SCREW SET IN PLACE AND REMOVED RAPIDLY, ITS FABRICATION PROCESS AND TOOL FOR ITS REMOVAL

[75] Inventor: Rodolphe Saint Martin, Le Havre, France

[73] Assignee: Sidel S.A., Le Havre, France

[21] Appl. No.: 08/952,121

[22] PCT Filed: May 7, 1996

[86] PCT No.: PCT/FR96/00688

§ 371 Date: Nov. 7, 1997

§ 102(e) Date: Nov. 7, 1997

[87] PCT Pub. No.: WO96/35883

PCT Pub. Date: Nov. 14, 1996

[30] Foreign Application Priority Data

May 11, 1995 [FR] France ................................. 95/05600

[51] Int. Cl.$^7$ ............................................. B25B 7/02
[52] U.S. Cl. ..................... 81/419; 411/385; 411/433; 470/9
[58] Field of Search ..................... 411/385, 433, 411/267, 270, 384, 324; 81/418–420; 470/9, 10

[56] References Cited

U.S. PATENT DOCUMENTS

| | | | |
|---|---|---|---|
| 1,536,241 | 5/1925 | Sroka | 81/418 X |
| 2,087,114 | 7/1937 | Pearlstein. | |
| 3,561,316 | 2/1971 | Karges. | |
| 4,787,139 | 11/1988 | Sweet | 81/420 X |
| 5,217,464 | 6/1993 | McDonald | 81/419 X |

FOREIGN PATENT DOCUMENTS 1700102   5/1971   Germany.

*Primary Examiner*—D. S. Meislin
*Attorney, Agent, or Firm*—Sughrue, Mion, Zinn, Macpeak & Seas PLLC

[57] ABSTRACT

A screw intended to be set in place and removed rapidly. The screw is characterized in that the threads are intended to take two positions: a first position wherein they project at the periphery of a body (1) and a second position wherein they are retracted into the thickness of the body (1). The screw further comprises a displacement member (27) intended to displace the threads from one position to the other and a device for locking the threads (29, 36, 27, 38) in the extended position.

21 Claims, 3 Drawing Sheets

SCREW SET IN PLACE AND REMOVED RAPIDLY, ITS FABRICATION PROCESS AND TOOL FOR ITS REMOVAL

The invention concerns a screw designed to be installed and removed rapidly. It also relates to a manufacturing process and a tool for the removal thereof.

BACKGROUND OF THE INVENTION

The invention encompasses all screws designed to provide for attachment or assembly by virtue of being installed in a threaded hole in a complementary part. This is true, for example, of screws designed to work in conjunction with a nut, or of those intended to fasten at least two pieces together by virtue of being screwed into the threads of a threaded hole provided within at least one of these pieces.

One disadvantage of these conventional screws lies in the fact that the installation and removal thereof may entail relatively long, laborious operations.

In fact, the installation of a screw requires the following operations, performed in this order: 1) engagement of the screw threads into the threads of the complementary piece; 2) rotation of the screw until the screw head rests on one of the pieces; 3) tightening of the screw into the complementary piece by effecting a certain number of turns or partial turns once the screw head rests on the piece.

Removal of the screw requires the following operations: 1) loosening; 2) rotation of the screw to disengage the threads from the threading in the complementary piece; 3) removal of the screw from the complementary piece.

In fact, the rotation step (the second step involved in the installation or removal summarized above) are the most lengthy. This may be bothersome when the screws are, for example, designed to fasten individualized parts on a machine tool. It is desirable in this case that the stoppage of the machine, as required in order to replace these parts, be as short as possible, so as to reduce operating costs, while not decreasing excessively the production capacity thereof.

The present state of the art includes devices which allow fastening or disassembly in a short time. However, these known devices normally provide inferior fastening quality: they exhibit either pronounced sensitivity to vibrations or inferior mechanical strength.

Thus, for example, quarter-turn or bayonet-type locking devices are known, in which a lug borne by an attachment rod is engaged and locked, following a slight degree of rotation, in a slot-and-cam mechanism which locks another part in place.

These devices exhibit a certain level of elasticity, which makes them unsuitable for attaching pieces subjected to vibrations, for example.

Thus, the invention concerns a device which can be installed and removed rapidly, but which does not possess the disadvantages of conventional devices.

SUMMARY OF THE INVENTION

According to the invention, a screw comprising a cylindrical body and threads, wherein the thereads are arranged so as to be able to adopt two positions: a first position in which the threads project outwardly beyond an outer circumference of the cylindrical body, and a second position in which the threads are retracted into the cylindrical body such that the threads do not project outwardly beyond the outer circumference of the cylindrical body. Further, the screw comprises means (12; 13; 14; 26, 27, 29; 32, 33, 34, 35) for moving the threads from the second position to the first position, and means (29; 36, 37, 38) for locking the threads in the first position and for unlocking the threads locked in that first position, thereby allowing the threads to retract into the cylindrical body.

The invention thus makes it possible to retain the advantages of screws and to do away with their disadvantages, primarily by eliminating the long, laborious rotation steps involved when the screw is inserted or removed: In the present invention during insertion, the threads are unlocked and are able to retract into the cylindrical body, thus making it possible to drive in the screw until the screw head rests in a supported position without having to rotate the screw. Then after the head becomes supported, it suffices simply to place the threads in their projecting position and then to perform the tightening operation, merely by effecting several partial turns. Similary, during removal, it suffices to loosen the screw, then to unlock the threads to allow the threads to react in order to be able to remove it, again without having to rotate the screw.

According to another embodiment, the screw-movement means are combined with the thread-locking means.

According to another embodiment, threads are produced on sectors that are movable radially in relation to the body, and the retracted or projecting positions of the threads in relation to the body are determined by the positions of the sectors in this body.

According to still another embodiment, the screw is configured so that the thread-projecting position is stable. In this way, the screw cannot be removed or loosened unexpectedly.

One process for producing the screw according to the invention is characterized by machine finishing the sectors, in order to realize the threads, after sectors have been positioned in the body of the screw and have been locked in the projecting position.

There is, therefore, no need to provide special equipment to machine-finish the threads. A conventional threading tool, for example, suffices the body of the screw with the projecting sectors are placed in a conventional threading tool, and the threads are machinefinished just as for a conventional screw.

Another advantage of machine-finishing the sectors after the positioning of the threads in the projecting position, described above, is that depending on the pitch and contour of the threads, the relative arrangement of the thread portions may not be the same on all of the sectors. As a result, machine-finishing the sectors prior to mounting them could require, first, a different adjustment of the machining tool for each sector, and, second, the marking or identification of the sectors, thus allowing them to then be mounted in the correct relative position in the body. Machine-finishing after positioning thus avoids the adjustment and marking requirements and reduces the production cost of such a screw.

According to another feature, a tool used to handle the screw before it is tightened or after it is loosened is characterized by the fact that this tool comprises means for grasping the screw and controlling the means for moving of the threads and the mechanism used to lock the threads in a projecting configuration, in order to release them and bring the threads into the retracted position.

Other features and advantages of the invention will emerge from a reading of the description of the figures below, in which:

DETAILED DESCRIPTION OF THE PREFERRED EMBODIMENTS

Figure 1:
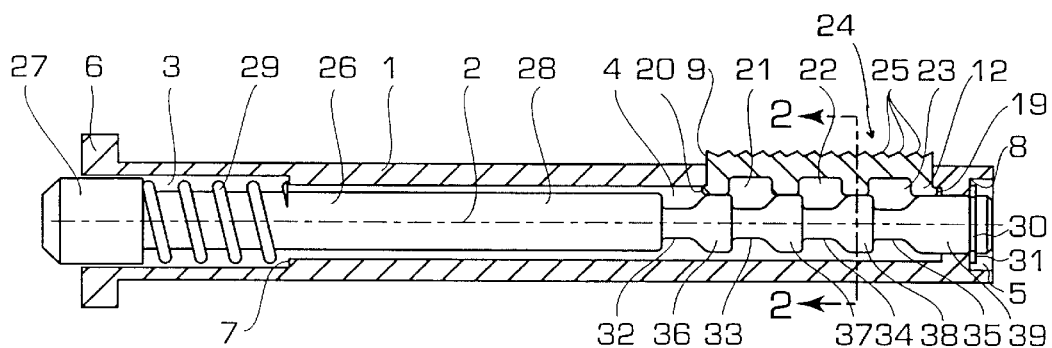
FIG. 1 is a partial longitudinal cross-section of a preferred embodiment of a screw according to the invention, the sectors being in the thread-projecting position after machine-finishing of the latter.
Figure 2:
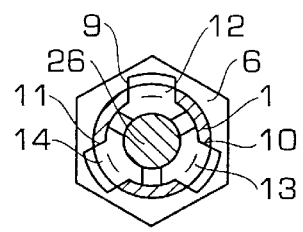
FIG. 2 is a cross-section along line 2—2 in FIG. 1.
Figure 3:
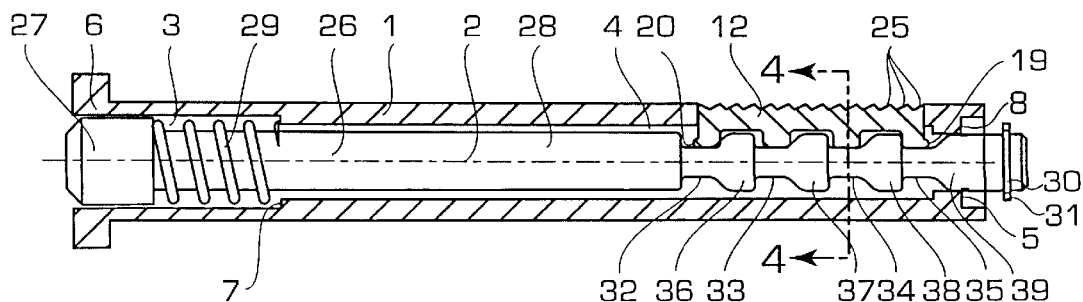
FIG. 3 is a partial longitudinal cross-section of the screw illustrated in FIG. 1, the sectors being in the thread-retracted position after machine-finishing of the latter.

The screw shown in FIGS. 1–4 comprises a body 1 (illustrated in longitudinal cross-section in FIGS. 1 and 3), which is formed by a cylindrical tube through the entire length of which a hole centered on its longitudinal axis 2 extends. In the example shown, the hole is composed of three concentric cylindrical sections 3, 4, 5, as shown in FIGS. 1 and 3.

A first end of the body 1 incorporates a polygonal head 6 used to tighten or loosen the screw, as will be explained below.

A first section 3 of the hole extending through the tube opens onto this first end of the tube 1 and, in addition, connects with a second section 4. The diameter of the first section 3 is greater than that of the second section 4.

The second section 4 connects with the third section 5 which opens onto the second end of the body 1. The diameter of the third section 5 is greater than that of the second section 4.

The difference in diameter at the junction between the first section 3 and the second section 4 thus forms an annular stop 7 at this junction.

Similarly, the difference in diameter between the second section 4 and the third section 5 creates another annular stop 8 at the junction between these two sections.

Figure 4:
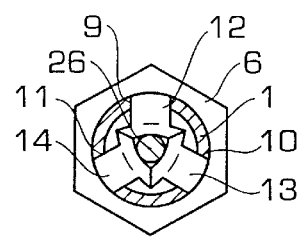
FIG. 4 is a cross-section along line 4—4 in FIG. 3.

In the embodiment illustrated, three openings 9, 10, 11, which are uniformly spaced on the circumference of the body 1, that is, by 120° from each other, are provided so as to open into the second section 4 in proximity to the junction between this section 4 and the third section 5. A single opening 9 is shown in FIGS. 1 and 3; on the other hand, all three are illustrated in FIGS. 2 and 4.

Each opening consists of an elongated slot directed parallel to the axis 2 of the body 1. Each opening is delimited, on the one hand, by two long, parallel planar edges, and, on the other, by two small rounded edges positioned opposite each other, which form the two ends of the slot.

Furthermore, each opening is arranged so as to possess a longitudinal plane of symmetry which extends radially in relation to the body 1.

Thus, the two long edges of each opening are not only parallel to each other, but also parallel to this longitudinal plane of symmetry.

Finally, the two rounded edges of each opening are identical to each other and possess a uniform radius of curvature within the entire thickness of the opening.

These openings may easily be milled using a cylindrical cutting tool. The axis of rotation of the cutting tool is shifted during the milling operation within the radial plane of symmetry of the opening, while at the same time being kept continuously perpendicular to the axis of the body.

Accordingly, it is the diameter of the cutting tool which determines, first, the spacing between the two planar edges of the opening and, second, the radius of curvature of the rounded edges which form the ends of the openings.

Each opening 9, 10, 11 encloses a sector 12, 13, 14, respectively, which travels radially in relation to the body 1, that is, it may move closer to or farther away from the longitudinal axis of the body. In the example shown in the figures, each sector is shaped like a small bar.

Figure 5:
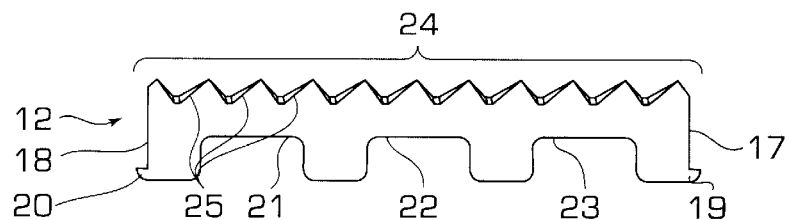
FIG. 5 is a side view of a sector.
Figure 6:
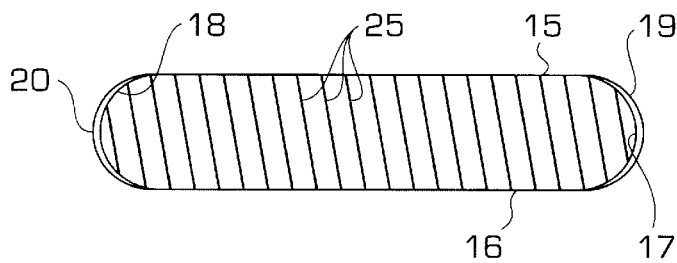
FIG. 6 is a top view of a sector on which is located thread segments.
Figure 7:
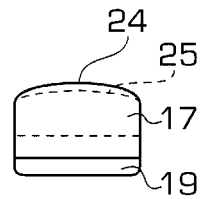
FIG. 7 is an end view of a sector.

The production detail of a sector conforming to those illustrated in FIGS. 1 to 4 is shown in FIGS. 5, 6, and 7.

In a top view, that is, when seen from the thread side (FIG. 6), each sector has a shape allowing it to be inserted into the respective opening and to travel freely radially in relation to the body 1.

To this end, each sector has an elongated central part delimited by two flat, parallel walls 15, 16 and by two semi-cylindrical ends 17, 18. The length of the elongate central part equals the length of the long edges of the opening 9, 10, 11 provided in the body 1.

The radius of curvature of the semi-cylindrical ends 17, 18 is appreciably smaller than the radius of curvature of the rounded edges of the openings. As a result, the width of a sector, or in other words the spacing between its flat walls 15, 16, is appreciably smaller than the distance separating the planar edges of the openings. These sizing differences allow radial travel of a sector in an opening without jamming.

To prevent a sector from sliding out of the screw body 1 when engaged in the opening, means are provided to restrict the radial travel of the sectors from the inside to the outside of the body.

In the preferred embodiment shown in FIGS. 5 to 7, these means consist of two stops 19, 20, each shaped like a ring section, one of which 19 encloses at least partially the lower portion of one semi-cylindrical end 17, and the other 20, the lower portion of the opposite semi-cylindrical end 18. Furthermore, the exterior radius of curvature of each stop is larger than the radius of curvature of the rounded ends of each opening. Consequently, the dimensions of the sectors at the stops are larger than those of the openings, thereby preventing these sectors from accidentally slipping out and being lost when they are positioned in the openings, the sectors being positioned in the openings in such a way that the stops are inside the hole produced in the body 1.

As shown in FIG. 5, the so-called lower wall of a sector (i.e., the wall inside the screw body when the sector is put in place) is provided with notches 21, 22, 23, which are produced within the width of the sector. The function of the notches and of the solid parts bordering each notch will be explained below.

As shown in FIGS. 5 and 6, thread segments 25 are produced on the so-called upper wall 24 of each sector, i.e., the sector wall set opposite the wall incorporating the notches 21, 22, 23. As a result, as shown in FIG. 7, which is an end view of a sector, this upper wall 24 is rounded.

As illustrated in FIG. 6, each of the thread segments 25 is positioned obliquely in relation to the width, i.e., the dimension extending between the two lateral walls 15, 16 of a sector, thereby joining one lateral wall 15 to the other 16.

The spacing between the thread segments 25 and the angle they form with the lateral walls 15, 16 is a function of the pitch and diameter of the screw.

As will be explained in detail below, the thread segments 25 are preferably machine-finished after installation of the sectors in the openings 9, 10, 11 of the screw body. To facilitate such machine-finishing, the upper wall 24 of each sector is preferably round prior to finishing. In this case, the radius of curvature before machine-finishing is uniform over the entire length of this wall and matches the final outer radius of the screw. Accordingly, if the screw has a diameter of 10 mm, the radius of curvature of the upper wall 24 of the sectors is 5 mm prior to machine-finishing of the threads.

As FIGS. 1 to 4 show in particular, a shaft 26 extends inside of the hole composed of three sections 3, 4, 5 drilled in the body.

The total length of the rod 26 is slightly greater than that of the body 1. The shaft comprises two concentric cylindrical elements: a first element 27 whose diameter is slightly smaller than that of the first section 3 of the hole, but still larger than that of the second section 4; and a second element 28 whose diameter is slightly smaller than that of the second section 4.

The free end of the first element 27 forms a first end of the shaft; the free end of the second element 28 forms a second end.

A helical spring 29 whose outer diameter is both smaller than that of the first section 3 and larger than that of the second section 4 is positioned in the first section 3. The dimensions of the spring are thus such that its course of travel in the hole is limited by the stop 7 located at the junction between the first section 3 and the second section 4. It cannot move from the first section 3 into the second section 4.

Moreover, the inner diameter of the spring is both larger than that of the second element 28 of the shaft 26, so that this element can slide freely in the spring, and smaller than that of the first element 27 of the shaft 26. When the shaft 26 is in place in the body 1, the spring 29 both encloses part of the second element 28 of the shaft 26 and is able to be compressed between the stop 7 (found between the first 3 and second 4 sections) and the first element 27 of the shaft, as FIGS. 1 and 3 reveal.

Near the second end of the shaft 26, that is, near the free end of the second section 4 and around it, an annular recess 30, which houses a crescent-shaped ring.

The outer diameter of the ring 31 is both smaller than the diameter of the third section 5 and larger than the diameter of the second section 4. Accordingly, when the shaft 26, the sectors 12, 13, 14 and the spring 29 are positioned in the body 1, and when the ring 31 itself is positioned in the annular recess 30, the shaft can no longer come out again, since the ring rests against the stop 8 located at the junction between the second and third sections (FIG. 1).

As FIG. 1 illustrates, the length of the shaft 26 is such that, when the ring 31 is in contact with the stop 8 at the junction between the second section 4 and third section 5 a part of the first element 27 of the shaft 26 emerges from the body 1 on the screw head 6 side.

As will be explained in greater detail, the person using the screw employs this part to push in the shaft to unlock the threads, thereby allowing the threads to retract into the body of the screw, while the opposing force of the spring draws the threads into the projecting position.

Annular recesses 32, 33, 34, 35 are produced on the second element 28 of the shaft in a region thereof which faces opposite the sectors. The number of recesses, the spacing and width thereof correspond to the number, spacing, and width of the solid parts bordering the notches 21, 22, 23 cut in the sectors. Furthermore, the depth of the recesses substantially matches the depth of the notches.

Two successive notches are separated by an annular protuberance whose outer diameter corresponds to that of the remainder of the second element 28 of the shaft. Thus, one sector incorporates the same number of annular protuberances 36, 37, 38 and of notches.

Each annular protuberance, whose total width correspond to that of a notch, comprises two distinct parts, one cylindrical and one inclined and tapered, as in the embodiment shown in FIGS. 1 and 3.

The tapered part of each protuberance 36, 37, 38 is closer to the first element 27 of the shaft 26 (i.e., the element on which the spring 23 rests) than is the corresponding cylindrical part.

Furthermore, the junction between a cylindrical and a corresponding tapered part is located at the base of said tapered part without any sudden transition, the diameter of the base of the truncated cone being equal to the diameter of the corresponding cylindrical part.

In addition, the junction between a tapered part and the adjacent annular recess is found at the vertex of a truncated cone. The diameter of the vertex of the truncated cone is equal to the diameter of this recess, so that no sudden transition occurs between the truncated cone and the annular recess.

Finally, the junction between the closest annular recess 35 to the second end of the shaft 26 (i.e., the end bearing the crescent-shaped ring 31) and the cylindrical part 39 of the shaft 26 terminating in this second end, is also produced by means of a concentric truncated part, whose vertex is located in the plane of junction with the annular recess 35, and whose base falls in the plane of junction with the cylindrical part 39.

The spacing between two successive annular recesses equals the spacing between two solid parts delimiting a notch 21, 22, 23, on a sector. Furthermore, the width of each annular recess is equal to, or slightly larger than, the width of each of said solid parts.

Similarly, on the one hand, the spacing between the cylindrical parts of two successive annular protuberances and, on the other, the spacing between the cylindrical portion of the annular protuberance 38 closest to the cylindrical part 39 of the shaft terminating in the second end, as well as this cylindrical part itself, and finally, in consequence, the spacing between two successive conical parts, are all equal to the spacing between two solid parts delimiting a notch 21, 22, 23.

Finally, the arrangement of the annular protuberances on the shaft is such that, when the crescent-shaped ring 31 rests against the stop 8 located at the junction between the second section 4 and third section 5 of the hole, on the one hand a solid end piece of a sector rests on the cylindrical part 39 of the shaft terminating at the second end thereof, and, on the other, each of the other solid parts rests on one of the cylindrical parts of the annular protuberances 36, 37, 38, as illustrated in FIG. 1. Furthermore, when the shaft is pushed back, the solid parts are located opposite the annular recesses, the notches 21, 22, 23 then overlapping the annular protuberances, as shown in FIG. 3.

Accordingly, when the solid parts delimiting the notches rest on the annular protuberances 36, 37, 38 and on the end portion 39 of the shaft 26, the sectors are pushed back toward the outside of the screw body 1, so that the upper walls 12 thereof, and thus the threads 25 after machine-finishing, project outward from the body, as shown in FIGS. 1 and 2.

When the solid parts delimiting the notches are located opposite the annular recesses 32, 33, 34, 35, the sectors can be drawn closer radially to the axis of the body, and the threads 25 produced in the upper wall thereof can retract within the body 1, as is apparent in FIGS. 3 and 4.

It will be noted that, in order not to include excessive detail in FIGS. 1 to 4, either only certain screw components have been shown in cross-section, or some components intersected by a cutting plane have not been rendered with cross-hatching, but these representational means in no way impair understanding of these figures. Accordingly, in FIGS. 1 and 3, only the body 1 and the sector 12 are shown in cross-section, while the shaft 26, the spring 29, and the crescent-shaped ring 31 are shown in side view. In FIGS. 2 and 4, only the body 1 and the shaft 26 are indicated by cross-hatchinig, but not the sectors 12, 13, 14, even though the respective cutting planes in the FIGS. 2 and 4 pass through these sectors.

Retraction of the threads 25 is allowed when the user presses on the element 27 of the shaft which projects outward at the screw head 6. The positioning and locking in the projecting position of these same threads occurs automatically, by releasing this element 27. Following release, the spring 29 pushes back the shaft 26. The solid parts delimiting the notches then slide on the truncated portions and become positioned on the annular protuberances and on the part 39 of the shaft, near the second end.

When the shaft has terminated its course of travel when acted upon by the spring, the crescent-shaped ring 31 then resting against the stop 8 between the second 4 and the third 5 sections of the hole. The sectors arc locked in the thread-projection position.

The screw is used in the following way.

To install the screw, the user presses on the element 27 of the shaft, thereby allowing retraction of the threads (FIGS. 3 and 4), then, while continuing to press, the user pushes the screw in until it is stopped. As soon as the screw is stopped, the user relaxes his pressing action, thus causing the threads to emerge (FIGS. 1 and 2). The user need then only tighten the screw at the prescribed torque. The user thus no longer must rotate the screw, often over a large number of turns, between the time it is inserted in the complementary piece and the time it reaches the stopped position.

To remove the screw, the user need only release the screw by means of a key or tool which fits the head 6, then simply withdraw the screw while allowing retraction of the threads by pressing on the element 27 of the shaft. In this way, the user need not effect all of the rotations between the loosening and complete removal of the screw.

Figure 8:
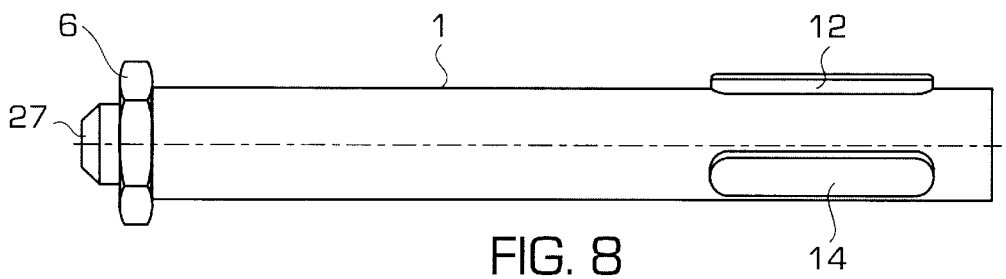
FIG. 8 is an exterior view of the screw, prior to machine-finishing of the threads on the sectors when the sectors are in the projecting position.
Figure 9:
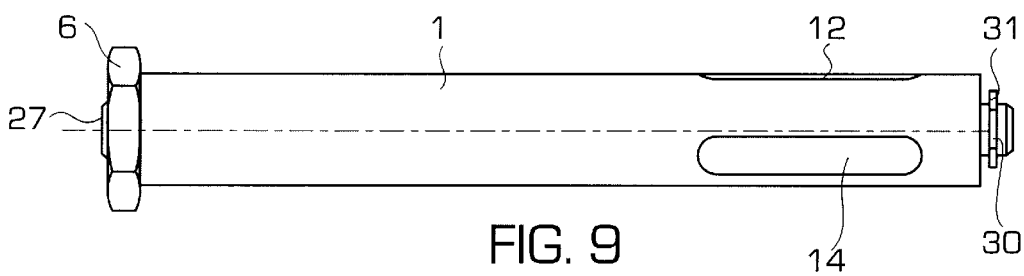
FIG. 9 is an exterior view of the screw prior to machine-finishing of the threads on the sectors when the sectors are in the retracted position.

As previously mentioned, the screw is preferably mounted by using sectors on which thread segments 25 are not machine-finished. The threads are machine-finished after all of the components (shaft, spring, sectors, crescent-shaped ring) have been positioned respectively in the body 1. FIGS. 8 and 9 illustrate this assembly, FIG. 8 when the sectors project outward, and FIG. 9 when they are retracted.

It will be recalled that this way of working prevents sector-installation errors and reduces the cost of manufacture of the screws according to the invention. In fact, at the outset all of the sectors are identical, but, after machine-finishing, the relative arrangement of the thread segments 25 may differ from one sector to another, depending on the threads.

Furthermore, this way of working avoids the use of a special tool; conventional thread-production equipment, such as a lathe or die, is sufficient.

Production of the threads obviously occurs when the sectors are in the projecting position (position shown in FIG. 8). After machine-finishing the sectors, the result is a screw such as that shown in FIGS. 1 and 2.

Of course, the invention is not limited to the embodiment described.

In particular, the number of sectors could be other than three. Nevertheless, there are preferably at least two sectors, and they are preferably arranged on the circumference of the body, so that the tightening forces are evenly distributed over the circumference of the body and on the shaft. Thus when there are two sectors, they are preferably diametrically opposite each other. When there are three sectors, they are preferably spaced apart by 120°. In other words, if there are n sectors, the preferred angle between two adjacent sectors is 360°/n.

In addition, instead of a polygonal head, the screw may incorporate a head having another shape.

Similarly, the presence of a hole with cylindrical sections in the body and the presence of a shaft having a cylindrical section are not basic requirements. These cylindrical shapes have the advantage of being easy to machine-finish.

In addition, in the case of a shaft having a cylindrical section, it is not imperative that the annular protuberances each comprise a tapered portion. The important point is the presence of complementary means on the shaft 26 and/or on the sectors 12, 13, 14, such as inclined or curved sections, which allow the solid parts delimiting the notches to move to the bottom of the annular recesses above the cylindrical portions of the protuberances when acted upon mechanically by the shaft, when this shaft is pushed back into its stable position by the spring 29. Thus, the inclined or curved sections could replace each tapered part on the shaft. Variants could also be designed in which said means, such as inclined or curved sectors, would be produced on the sectors themselves. Each notch would, for example, be connected to one of the solid parts delimiting it by an inclined or curved section. Or again, the design could embody inclined or curved sections on both the shaft and the sectors.

Furthermore, a variant could be devised in which the shaft would be pulled, instead of being pushed, in order to allow the retraction of the sectors. This would presuppose that the shaft incorporated gripping means, thereby complicating appreciably the machine-finishing thereof and increasing the cost of the screw.

Finally the recess 30/crescent-shaped ring 31 assembly could be replaced by equivalent means such as a key or other device.

Other modifications within the capability of those skilled in the art could be made and must be held to fall within the scope of the present application.

The screw according to the invention can be easily installed without special tools. In fact, the user need only press on the element 27 of the shaft which forms a projection near the head 6 in order to insert the screw, then lock it with a wrench or other suitable tool.

On the other hand, although the screw may be withdrawn without using a special tool, it is nevertheless preferably to supply one such tool. In fact, to remove the screw after loosening, the user must press on the element 27 forming a projection near the screw head 6, in order to disengage the threads on the inside of the body, and must also pull simultaneously on the head in order to extract the screw. These two actions are thus opposing ones, thereby making the removal operation tricky in some cases.

Figure 12:
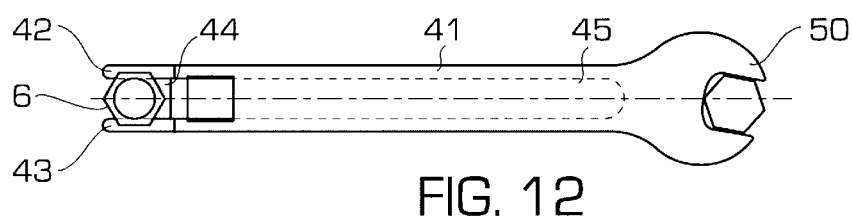
FIGS. 10–12 illustrate a tool designed for the installation and/or removal of the screw and the manner in which it is used.
Figure 10:
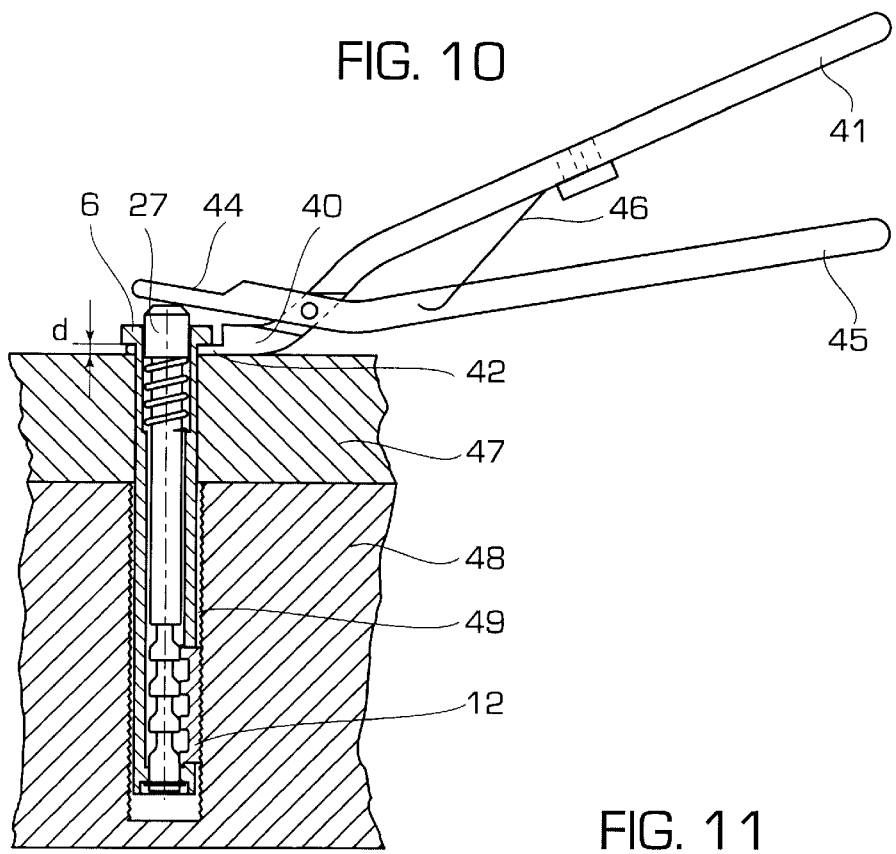
Figure 11:
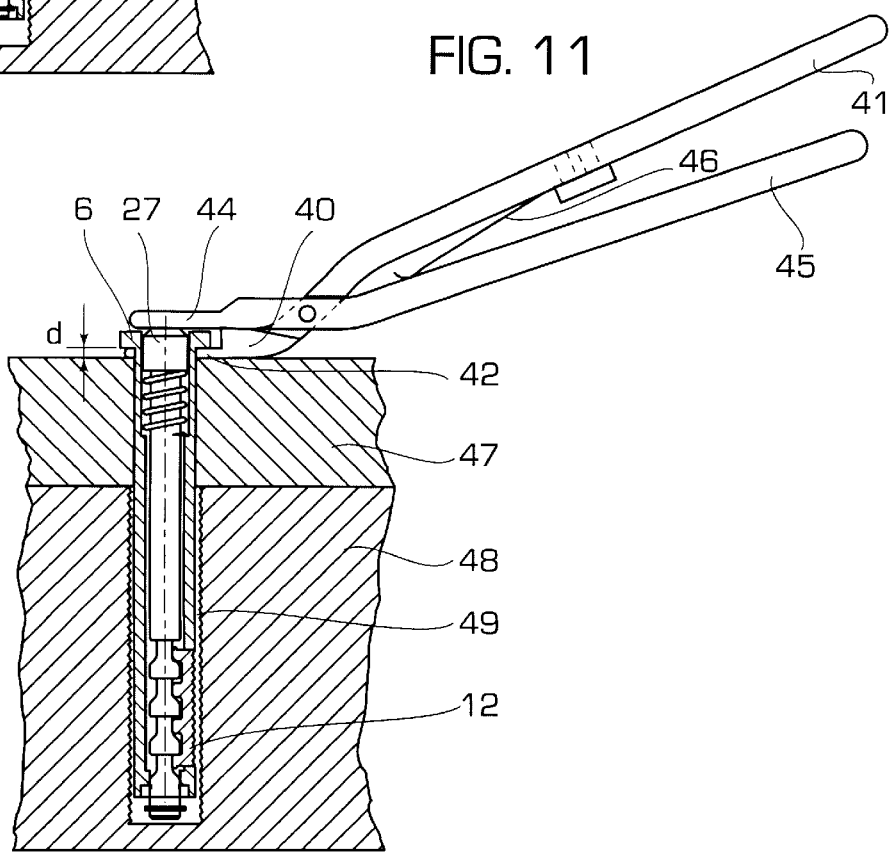

FIGS. 10 to 12 illustrate a special tool for performing these operations.

This tool is pliers whose jaw 40, which is positioned at one end of a first arm 41, is provided with two parallel fingers 42, 43 (shown in FIG. 12) which are spaced apart by a distance at least equivalent to the outer diameter of the body 1. The other jaw 44, which is located at one end of a second arm 45 jointed to the first, is flat.

Preferably, a spring 46 makes it possible to spread apart the two arms, and thus the two jaws 40, 44 when the user leaves the pliers in the resting position.

FIGS. 10 and 11 illustrate the way in which the tool may be used to remove a screw used to clamp a first piece 47 between the screw head 6 and a second piece 48, the latter at least incorporating a threaded hole 49. The user must first release the screw and cause it to undergo a limited number of turns or partial turns sufficient to spread apart the head 6 and the piece 47 to which the screw is fastened by a distance d, which is at least equal to the thickness of the fingers 42, 43. The user need then only slide the fingers 42, 43 beneath the head and either side of the body (FIG. 10), then (FIG. 11) draw the two jaws together using the control arms 41, 45 of the pliers. The flat jaw 44 is then supported on the shaft element 27 forming a projection near the head 6, thus allowing removal of the sectors (of which one 12 is shown in FIGS. 10 and 11) within the screw body 1, and, as a result, the disengagement of the threads 25 from the threadings in the threaded hole 49. By keeping the pliers tightened, the screw can then be easily removed.

Of course, these pliers can also be used to install the screw.

In a preferred embodiment of the pliers shown in FIG. 12, one of the arms 41 incorporates, at the other end thereof, a device 50 whose shape and size are suitable for tightening or loosening the screw. Accordingly, in the case of hexagonal head screws, this device would be a flat wrench fitting the dimensions of the head.

As the foregoing makes clear, the invention is not limited to the embodiments described, but encompasses all of the variants within the capability of those skilled in the art.

I claim:

1. A screw, comprising a cylindrical body (1) and threads (25), wherein the threads are arranged so as to be able to adopt two positions: a first position in which said threads project outwardly beyond an outer circumference of said cylindrical body, and a second position in which said threads are retracted into said cylindrical body such that said threads do not project outwardly beyond said outer circumference of said cylindrical body, and wherein said screw comprises means (12; 13; 14; 26, 27, 29; 32, 33, 34, 35) for moving said threads from said second position to said first position, and means (29; 36, 37, 38) for locking said threads in said first position and for unlocking said threads locked in said first position, thereby allowing said threads to retract into said body.

2. A screw according to claim 1, wherein a portion of said means for moving said threads from said second position to said first position includes said means for locking said threads in said first position and for unlocking said threads locked in said first position.

3. A screw according to claim 1, wherein said screw comprises at least one sector (12, 13, 14) which is movable radially in relation to the body, wherein threads (25) are produced on a first surface (24) of said at least one sector, and wherein said first position and said second position of said threads are determined by a position of said at least one sector inside said body.

4. A screw according to claim 3, wherein the body (1) incorporates a longitudinal hole (3, 4, 5), so that said body (1) forms a tube; wherein at least one opening (9, 10, 11) passes through the wall of the tube; wherein said at least one sector (12, 13, 14) is positioned in a corresponding said at least one opening; wherein a shaft (26) is provided within said tube; and wherein the shaft and said at least one sector are fitted with complementary means (32, 33, 34, 35, 36, 37, 38; 21, 22, 23) which interact reciprocally to cause said at least one sector to move to an outer position, placing said threads in said first position, or to allow said at least one sector to move to an inner position, placing said threads in said second position, depending on the direction of motion of said shaft.

5. A screw according to claim 4, wherein the shaft (26) is adapted to move axially within said tube.

6. A screw according to claim 5, wherein a return means (29) is provided within said body (1) and biases said shaft (26) axially in a direction that causes said at least one sector to move to said outer position.

7. A screw according to claim 4 wherein said complementary means comprises an alternating series of annular recesses (32, 33, 34, 35) and annular protuberances (36, 37, 38) on said shaft (26) and an alternating series of solid parts and notches (21, 22, 23) arranged on a second surface of said at least one sector located opposite said first surface (24) of said at least one sector incorporating said threads (25); and wherein the spacing between two successive annular recesses (32, 33, 34, 35) in the shaft (26) is equal to the distance between adjacent solid parts delimiting a notch (21, 22, 23) in each sector.

8. A screw according to claim 7, wherein each of said annular protuberances on the shaft (26) comprises a cylindrical part and an inclined part, wherein said cylindrical part abuts one of said solid parts when said at least one sector is placed in said outer position wherein said inclined part connects said cylindrical part to a corresponding adjacent annular recess, and wherein said corresponding adjacent annular recess receives said one of said solid parts when said sector is placed in said inner position.

9. A screw according to claim 7, wherein each notch is connected to one of the solid parts delimiting said notch by means of an inclined section.

10. A screw according to claim 7, wherein a width of said annular recesses in said shaft is equal to or greater than a width of said solid parts between adjacent notches on said at least one sector.

11. A screw according to claim 4, wherein said at least one opening (9, 10, 11) of said body (1) has a longitudinal plane of symmetry extending radially in relation to said body (1), and incorporates two long edges which are substantially parallel to each other and to said longitudinal plane of symmetry and incorporates two transverse edges which are substantially parallel to each other and are perpendicular to said longitudinal plane of symmetry, wherein each of said at least one sector has a shape corresponding to a shape of said at least one opening, wherein a longitudinal dimension and a transverse dimension of each of said at least one sector is smaller than corresponding dimensions of said at least one opening, and wherein limiting means (19, 20) are provided for limiting radial travel of said at least one sector.

12. A screw according to claim 11, wherein said limiting means are mechanical stops extending from at least one surface of said at least one sector (19, 20).

13. A screw according to claim 4, wherein an end of said body (1) is fitted with a head (6) used to control the tightening or loosening thereof, and wherein said shaft incorporates an element (27) which extends beyond said body at said end when said at least one sector is in said outer position.

14. A screw according to claim 13 further comprising a return means (29) biasing said element (27) to extend beyond said body at said end when said shaft is in an equilibrium position.

15. A screw according to claim 14, wherein said tube includes a plurality of stops (7, 8) to constrain motion of said shaft along a lengthwise direction of said tube within a predetermined range of motion.

16. Tool used to remove and/or install a screw according to claim 14, wherein said tool consists of pliers with fingers (42, 43) used to hold the screw beneath the head (6) thereof and of a jaw (44) which drives the shaft in when the pliers are squeezed, thus causing the retraction of the threads.

17. Tool according to claim 16, wherein said tool comprises an arm (41) incorporating, at one of the ends thereof, a device (50) configured to match the shape and dimensions of the head (6) and used to tighten and/or loosen the screw.

18. A process for producing a screw comprising:
placing a screw blank in a threading tool; wherein said screw blank comprises a cylindrical body (1) forming a tube and including a plurality of sections (3, 4, 5) having different diameters within said tube, wherein at least one opening (9, 10, 11) passes through the wall of the tube and into one of said plurality of sections; wherein at least one sector (12, 13, 14) has a non-threaded outer surface and is positioned in a corresponding said at least one opening to move within said at least one opening in a radial direction relative to said body; wherein a shaft provided in said tube is fitted with a plurality of alternating projections and recesses (32, 33, 34, 35, 36, 37, 38) which interact reciprocally, upon motion of said shaft in an axial direction along said tube, with a corresponding plurality of alternating projections and recesses (21, 22, 23) on said at least one sector to either cause said at least one sector to move to an outer position or to allow said at least one sector to move to an inner position; and wherein said non-threaded outer surface of said at least one sector projects beyond an outer circumference of said cylindrical body when said at least one sector is disposed in said outer position;
moving said at least one sector to an outer position;
machine-finishing threads in said non-threaded outer surface of said at least one sector.

19. A screw comprising:
a cylindrical body in the form of a tube, said tube having an opening in an outer circumferential portion thereof;
at least one sector piece including threads on one side and protuberances on another side, said at least one sector piece being movably provided within said opening; and
a shaft included within said cylindrical body,
wherein said shaft includes protuberances which respectively engage said protuberances of said at least one sector piece and move said at least one sector piece when said shaft moves along an axis of said tube, and
wherein upon motion of said shaft along said axis of said tube said at least one sector piece adopts at least one of a first position in which said threads on said one side of said at least one sector piece project outwardly beyond an outer circumference of said cylindrical body and a second position in which said threads are retracted into said cylindrical body such that said threads do not project outwardly beyond said outer circumference of said cylindrical body upon corresponding motion of said shaft along said axis of said tube.

20. A screw according to claim 19, wherein said protuberances on said at least one sector piece are spaced equally along said another side of at least one sector piece and wherein said protuberances on said shaft are spaced equally along a corresponding portion of said shaft, wherein a width of spaces between said protuberances on said at least one sector piece and said shaft are larger than a width of the corresponding protuberances on another of said at least one sector piece and said shaft.

21. A screw according to claim 20, wherein in said first position said protuberances on said at least one sector piece are positioned on top of said protuberances on said shaft, and wherein in said second position said protuberances on said at least one sector piece are positioned corresponding spaces between protuberances on said shaft.

* * * * *